F. N. MERWIN.
PHOTOMICROGRAPHICAL APPARATUS.
APPLICATION FILED SEPT. 9, 1907.

899,793.

Patented Sept. 29, 1908.
3 SHEETS—SHEET 2.

Witnesses.
C. L. Bronson.
R. J. Holmden.

Inventor.
Frank N. Merwin
By
Richd. V. Manning
Attorney.

F. N. MERWIN.
PHOTOMICROGRAPHICAL APPARATUS.
APPLICATION FILED SEPT. 9, 1907.
899,793.
Patented Sept. 29, 1908.
3 SHEETS—SHEET 3.
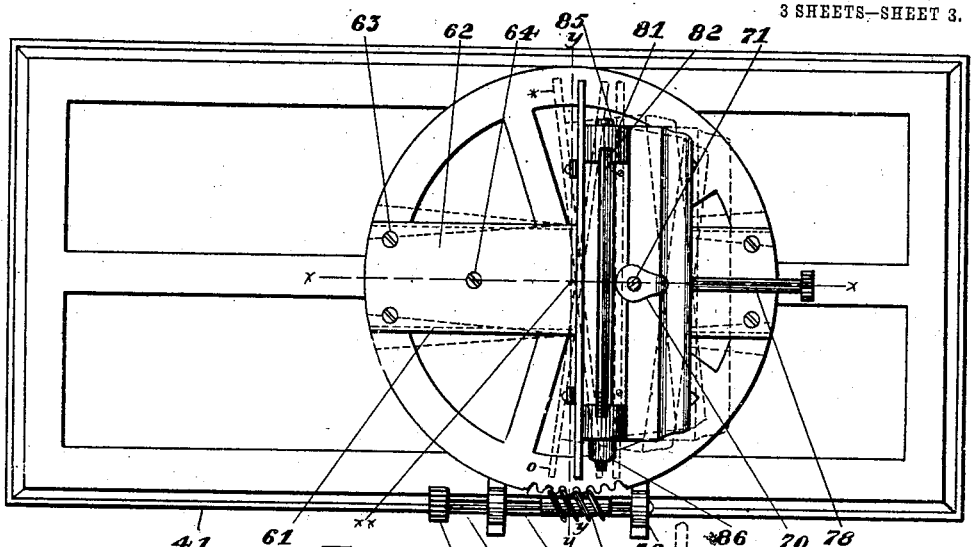
Fig. 3.
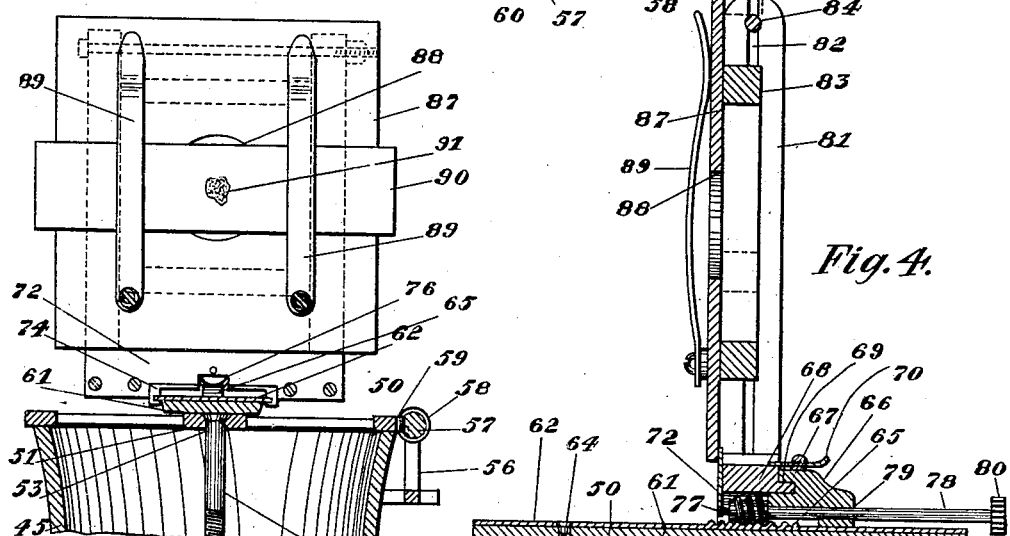
Fig. 4.
Fig. 5.
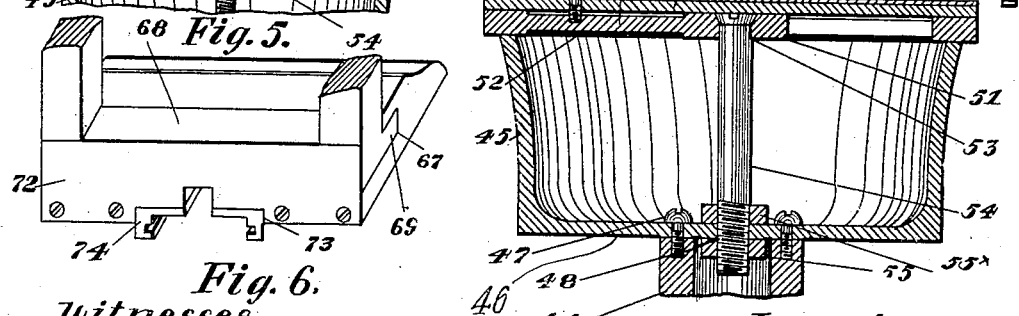
Fig. 6.
Witnesses.
C. L. Bronson.
R. J. Holmden.
Inventor.
Frank N. Merwin
By Rich & Manning
Attorney.
THE NORRIS PETERS CO., WASHINGTON, D. C.

UNITED STATES PATENT OFFICE.

FRANK N. MERWIN, OF KANSAS CITY, MISSOURI.

PHOTOMICROGRAPHICAL APPARATUS.

No. 899,793.  Specification of Letters Patent.  Patented Sept. 29, 1908.

Application filed September 9, 1907. Serial No. 391,994.

*To all whom it may concern:*

Be it known that I, FRANK N. MERWIN, a citizen of the United States of America, residing at Kansas City, in the county of Jackson and State of Missouri, have invented certain new and useful Improvements in Photomicrographical Apparatus; and I do hereby declare that the following is a full, clear, and exact description of the invention, such as will enable others to make and use the same, reference being had to the accompanying drawings, forming a part of this specification.

The primary object of the invention is to obtain stereoscopic pictures of microscopic objects, and secondly, to obtain micro-stereoscopic enlargements under different powers of the object.

In the taking of pictures by means of the ordinary camera, stereoscopically, two views are taken of the same object and each from a different position or angle, and in this procedure the camera is moved correspondingly from one position to another, and with repeated exposures, two pictures are taken of the same object and when the printed pictures are mounted side by side and viewed by means of the well-known stereoscope, they are merged into one picture and appear in relief or "life-like".

The details of construction and combination of parts of the apparatus will be first fully described and then specifically pointed out in the claims.

Figure 1:
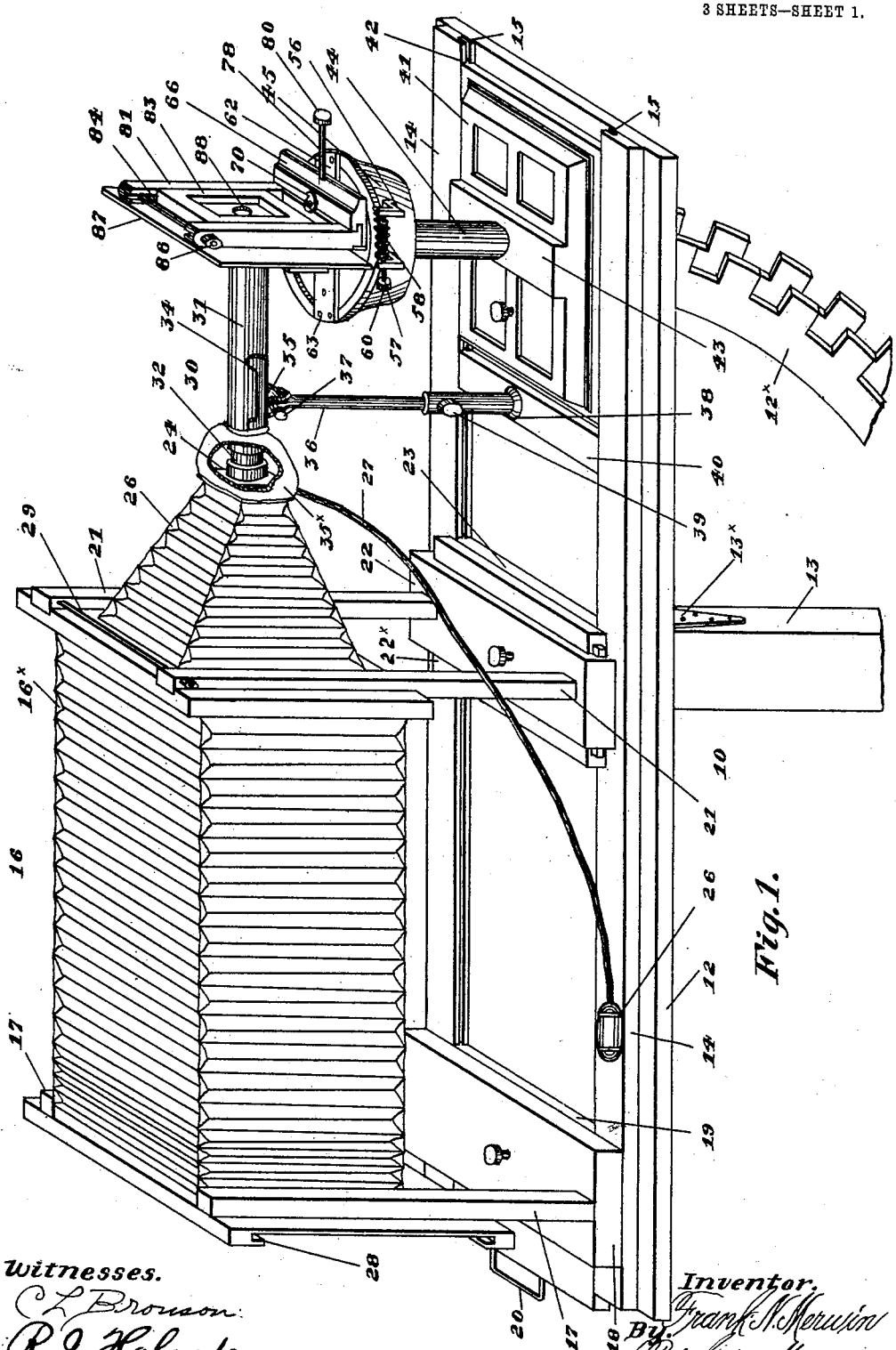
Figure 2:
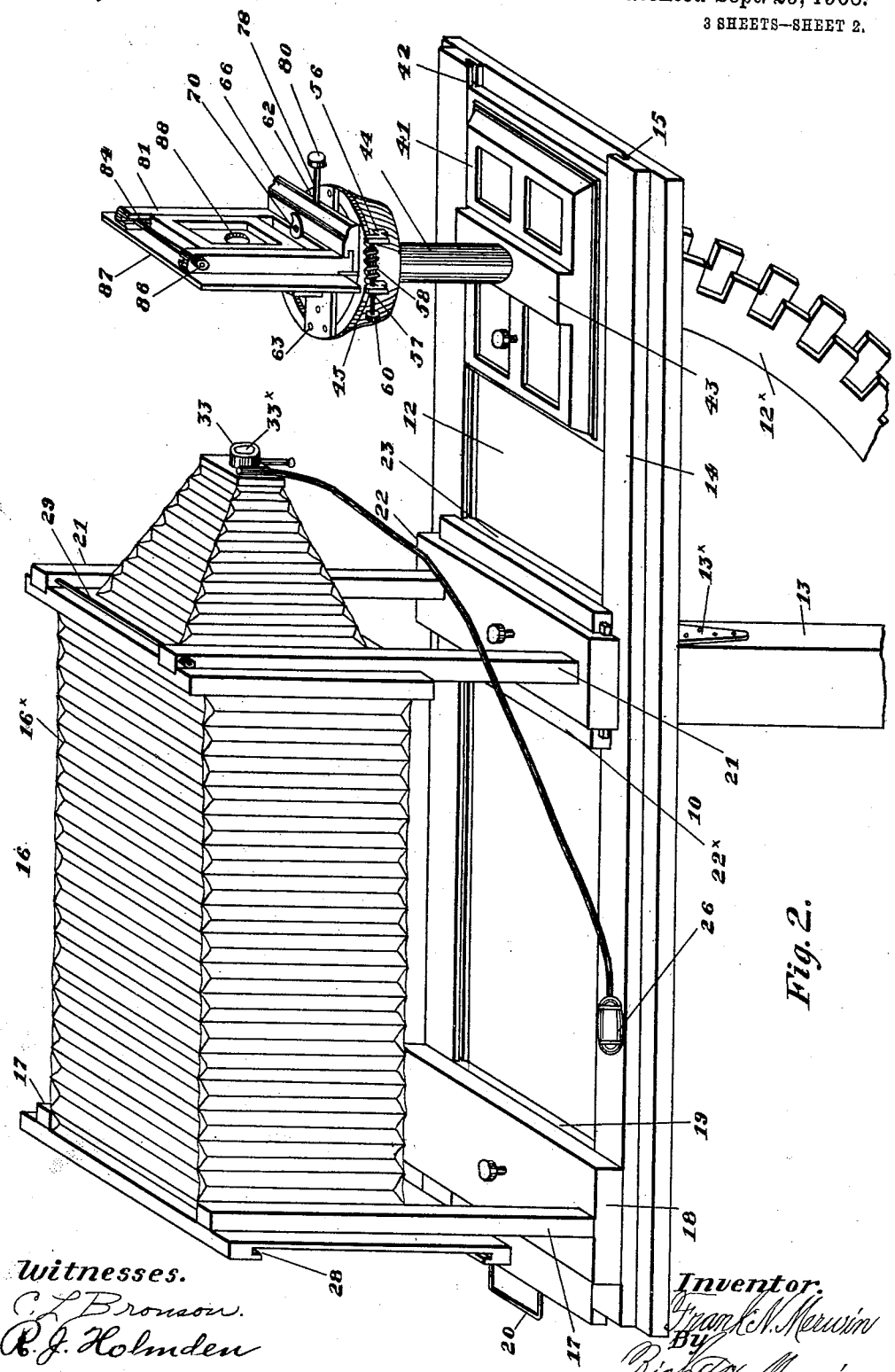

In the drawings: Figure 1 is an isometric view of an oscillatory camera stand and photographic apparatus showing the invention for obtaining micro-stereoscopic pictures, showing a compound microscope. Fig. 2 is a similar view to that seen in Fig. 1, showing a photographic apparatus provided with a high power lens. Fig. 3 is a detail plan view enlarged of the movable object supporting rotary stage upon the camera stand, showing the adjustments of the stage and object holder in dotted lines. Fig. 4 is a vertical sectional view of the rotary stage and its support taken upon the line $x, x$ on Fig. 3, showing a portion of the hollow standard on the sliding frame. Fig. 5 is a front view in detail of the object holder showing the stage and its support in vertical section taken upon the line $y, y$ on Fig. 3. Fig. 6 is a detail broken view of the lower portion of the specimen holder in perspective, showing the sliding supports.

Similar numerals of reference indicate corresponding parts in all the figures of the drawings.

Referring to the drawings: 10 indicates a supporting base or standard for a photographic apparatus which consists of a longitudinally extended plate or board or bed 12 of the requisite width. Upon the upper surface of the board or base 12 are parallel guide strips 14, arranged a short distance inwardly from the longitudinal outer surfaces of the board or bed 12. These strips are grooved at 15, longitudinally upon their inner surfaces, and are of the same length as the bed 12, which bed is in excess of the length required for the extension of the folding dark chamber of the camera. The bed 12 is hinged at a point equi-distant from its ends to an upright or standard 13 by means of the hinge $13^\times$, so as to be adjusted from a horizontal to a vertical position when necessary, a portion of the curved rack being shown at $12^\times$, connected with the under portion and at one end of the bed 12, sufficient to illustrate the well-known means of adjustment in camera stands.

16 indicates an ordinary photographic camera, the rear end of the folding dark chamber $16^\times$ of which is supported by the standards 17, mounted upon the transverse adjusting plate 18, secured to the upper surface of a sliding plate 19, which latter plate moves in the grooves 15, of the parallel grooved guide strips 14, and is provided with an operating handle 20. The forward end of the dark chamber $16^\times$ is supported by the standards 21, mounted upon a transverse plate 22, which plate is movable in the grooves 15 of the parallel grooved guide strips 14, and laterally adjustable between the grooved strips $22^\times$.

24 indicates the lens holder or plate on the focusing folding end of the dark chamber $16^\times$ of the camera provided with a photographic lens and shutter (not shown) the latter being operated by the compressible air holding bulb 26 and tube 27 in the ordinary and well known manner.

28 indicates the grooved plates for the sensitized plate holder, on the rear end of the dark chamber $16^\times$.

29 indicates the clamping rod for the upper ends of the standards 21, for supporting the forward end of the dark chamber from movement.

30 indicates a microscope, the one shown in the drawing being known as a compound microscope in which the lenses are supported within a tube 31 of the proper length and provided with an adjustable telescopic end portion 32, which is arranged close in position to the lens holding plate 24, a hood 35× being connected with the lens holding plate and the ocular or telescopic end of the microscope, the fitting of these parts being such as to prevent beams of light entering the dark chamber at the point of connection of the said parts. Upon one side of the outer tube 31, is an extension or handle 34, and connected with the said plate is a downwardly extended plate 35 formed in the segment of a circle. The latter plate 35 is connected adjustably to the upper end of a vertical adjusting rod, 36, by means of an adjusting screw, 37. The lower end of said rod 36 is mounted on a vertical supporting socket 38, and held vertically adjustable within said socket by means of an adjusting screw 39. The socket 39 is mounted upon a transverse plate 40, the ends of which are held slidably within the grooves 15 of the longitudinal strips 14.

Between the strips 14 at the forward end of the camera stand 10, and a short distance forward of the plate 40, is located the posing apparatus for the specimens, consisting of a sliding frame 41 upon the longitudinal outer portion of which are tongues, 42, fitted within the grooves 15, in the strips 14. Upon the upper surface of the frame is a fixed transverse strip 43, which is located a short distance in rear of a point equi-distant from the ends of said frame. Upon the strip 43 is fixedly mounted in a vertical position, a hollow standard or post, 44, which extends upwardly a short distance. Upon the top of the post 44 is a circular cup shaped receptacle 45, which forms the stationary part of the stage, the bottom 46 of the receptacle being flat and secured fixedly to the post by the screws, 47. In the bottom, 46, above the opening on post 44 is a perforation, 48.

Upon the upper annular surfaces of the cup shaped receptacle, 45, is mounted horizontally the adjustable rotary wheel or stage 50, which wheel is provided with a hub 51 and radial spokes 52. In the hub 51 is a reamed opening 53, in which is loosely fitted the head of a screw bolt or post 54, the lower end of the bolt extending through the opening 48 in the bottom 46 of the receptacle 45, and a short distance within the hollow post 44 and to said end of the bolt is fitted a nut 55, and in the receptacle 46, a similar nut, 55×, so as to prevent bending of the head of the bolt, the post 54 forming the vertical central axis of the stage, the position of the stage being a considerable distance below a line horizontal with the microscope. The adjusting devices for the wheel consist of two brackets, 56, upon one side of the receptacle 45 through the upwardly extended ends of which bracket extends horizontally a rod 57, upon which is a worm 58. Upon the peripheral portion of the wheel 50 is a worm-gear 59. The rod 57 is provided with a milled head, 60.

Upon the upper surface of the wheel 50 is a narrow flat plate, 61, extending over the hub 51 of the wheel 50, and to the peripheral portions of the wheel, and also in the direction of the camera. Upon the upper surface of the plate 61 is a flat plate 62 slightly wider than the plate 61, the ends of both plates 61 and 62 being secured by the screws 63 firmly to the peripheral portions of the wheel and by the screw 64 to one of the spokes of said wheel.

Upon the upper surface of plate 62 and at a point equi-distant from the longitudinal outer surfaces of said plate and in a vertical line with the post 54, is a worm gear or rack, 65, which extends a short distance forwardly upon the plate and from said axial line of the post 54. Upon the plate 62, forward of the rack 65, is a base or support for the object holding devices which consists of a strip 66, narrow in width, extending transversely to plate 62, and provided with a groove, 67, in its rear longitudinal portion. 68 indicates a supporting bar, parallel with the strip 66, upon the lower forward surface of which is a tongue 69, which extends within the groove 67, of the strip 66, the longitudinal movements of the bar 68 being prevented by means of a clip 70 bearing upon the upper surface of the bar 68, and secured fixedly by the screw 71, to the strip 66. Upon the rear surface of the bar 68 is secured fixedly a plate 72. The lower surface of the bar 68 and plate 72 is cut away at 73 in a transverse direction, so as to leave an opening slightly wider than the plate 62 (see Fig. 6), in which opening are the parallel grooved strips, 74, which receive the longitudinal outer portions of the plate 62 and extend forwardly to the strip 66. The grooved strips 74 are secured rigidly to the plate 72 and are slidable upon the plate 62. In the plate 74 and bar 68, above the opening 73 is a transverse notch 76, which is above the worm gear 65. In the opening, 73, in the bar 68, forward of plate 72, is a worm 77, which engages with the gear 65 on plate 62. With the worm 77 is connected an operating rod 78, which extends forwardly through an opening 79 in the transverse bar 66, and is provided with a milled head, 80.

Connected rigidly at the lower ends with the ends of the bar 68, are the parallel vertical clamping bars, 81, provided with grooves, 82, upon their inner surfaces. Between the clamping bars 81 is a small rectangular shaped frame 83, movable in a vertical position, and secured adjustably between said bars by means of an adjusting rod, 84, which extends through the upper ends of said bars, and is provided with a head, 85, upon one end, and screw threaded at the other end, upon which latter end is a thumb nut 86. Connected rigidly with the frame, 83, upon the rear side of said frame is a vertical plate 87, wider than frame 83, and provided with a circular opening, 88, which is in a horizontal line with the tube 31 of the microscope. With the rear surface of this plate 87, and near the lower portion, are connected the flat springs, 89, which extend upwardly on the respective opposite sides of the opening, 88. Within the grasp of the springs, 89, is shown a microscopic slide, 90, containing a specimen or object 91, located opposite the opening 88 and in position vertically for the specimen to be seen through the microscope.

In the operation of the invention, the specimen supporting and posing devices are adjusted by means of the adjusting rod, 78, which moves toward and away from the microscope so as to bring the vertical plate 87 to a position near the center of rotation of the stage 50, and the specimen 91, which is upon the slide 90, in a position in a direct vertical line with the post 54, the line passing vertically through the specimen and axially through the center of said post 54, upon which the stage has a rotary movement, the position of the specimen being such that when seen through the ground glass of the camera, the proper degree of enlargement may be obtained. The sensitized plate in its frame is then placed in position with the grooved holder at the rear end of the camera in readiness for exposure. The worm 58 on the side of the stage 50 is then operated by the adjusting rod 57 so as to partially rotate the stage, this movement placing the position of the plate 87 upon which the specimen is supported and posed at an angle to the microscope and to the line of vision through the microscope. An exposure is then given to the sensitized plate and the plate and frame removed and another sensitized plate and plate holder arranged in the guides 28 in the rear end of the dark chamber of the camera. The rotation of the stage 50 is now reversed by the action of adjusting rod 57, and the position of the plate 87 changed from the angle indicated in Fig. 3 at $o$, to the angle of the same degree to the microscope as indicated by the # in Fig. 3. An exposure is then made of the sensitized plate at the second angle and a view obtained from another side, as it were, of the specimen or object, this latter view being obtained without lateral displacement of the specimen, and with the same power of enlargement. From the negatives of the specimen thus obtained, prints are obtained in the usual manner and mounted side by side. The micro-photographic pictures of the specimens thus obtained when viewed through the ordinary stereoscope, merge into one picture and display the organic parts in relief with surpassing stereoscopic effect, the relief affording approximate distances to be calculated, and the magnified skeleton parts of insect life brought into full view for examination and study.

The movement of the specimen holder toward or away from the axial point of rotation of the stage enables a parallel adjustment to be obtained to any previous adjustment of the specimen holder, thus varying the distance objectively from the microscope. The invention affords a stereoscopic relief or roundness of an object hitherto unobtainable and objects viewed through the microscope, whose position must remain fixed, are obtained with stereoscopic results photographically. The specimen holder may be also adjusted laterally to any adjustment previously made by the rod 78, in order that the specimens may be brought over the vertical axial point of rotation of the stage, this being effected by a sliding movement imparted to the bar 68 held by the clip 70.

For low power magnification, I employ the modification seen in Fig. 2. In this view, the compound microscope is dispensed with, and a lens $33^\times$ of the desired power employed, the lens being arranged within the tube 33 as seen extending from the lens holder on the dark chamber $26^\times$ and the distance increased more or less from the specimen holder to accommodate the varying power of lens used. Large specimens mounted upon the plate 87 and properly adjusted in position from the lens, and the stage rotated to afford the proper angle, are photographed so as to afford superior stereo-magnification and the structural portions of specimens, which hitherto have been blotches upon the negative are fully defined and their position shown with accuracy.

I am aware that in photo-micrography stages have been connected with the camera, to be raised and lowered for centering the object to the lens, but I am not aware that heretofore any such improvements in apparatus for obtaining stereo-micrographical pictures as is obtained in my invention, for the reason that whatever pivots the posing plate swings upon in order to obtain the necessary angle for stereoscopic pictures there must be supplemental adjustments of the plate, that will bring the center of the specimen to be photographed directly over and in a line with the vertical center of said pivots, so the specimen will be held from any lateral movement, while being turned around the pivot.

The stage in my invention, is the horizontal support for the specimen holder, the vertical axis of rotation of this stage is the line passing through the center of the specimen, and the delicate adjustment of the holder of the specimen around this centering line produces a new, novel stereoscopic magnification with the microscope hitherto not known, the interior structure of the specimen being disclosed to the eye, with its full outward appearance of the body, an acquisition which enables an anatomy and analysis of specimens to be readily accomplished.

It is obvious that micro-stereoscopic negatives may be obtained of liquids, for which purpose the position of the apparatus may be changed from a horizontal to a vertical position, the adjusting screws holding the slidable parts of the apparatus from movement. It is also obvious that reductions of objects or specimens may be made by means of the invention.

Such other modifications may be employed as is within the scope of the invention.

Having fully described my invention, what I now claim as new and desire to secure by Letters Patent is:

1. In microscopic photography, the combination with a photographic apparatus and a microscope, of means for obtaining stereoscopic negatives from objective magnifications of the object or specimens consisting of a stage having an axis of rotation and devices supporting the specimens movable at an angle to the microscope and from the axis of rotation of the stage.

2. In microscopic photography the combination with a rotary supporting apparatus, of a holder for the specimens thereon, a photographic camera, means between the posing apparatus and camera acting to transmit magnifications of the specimens, and means acting to pose the holder to and from the axis of rotation of the support for the specimen holder.

3. In microscopic photography, the combination with a rotary supporting apparatus and a pivot post at the axis of rotation, a specimen holder, a photographic camera and means between the supporting apparatus and camera, acting to transmit magnifications of the specimens to the camera, of means acting adjustably to pose the specimen holder near the line of the vertical axis of the pivot post and means for adjusting the specimen holder at opposite angles horizontally to the axial line of the pivot post.

4. A posing apparatus for microscopic photography, consisting of a rotary stage, means for adjusting the position of the stage rotatively and a sliding specimen holder mounted upon said stage movable to and from the axis of rotation.

5. A posing apparatus for microscopic photography, consisting of a rotary stage, a pivot post therefor, means for adjusting the position of the stage rotatively, a vertical specimen holding frame and sliding supports therefor on said stage and adjusting means for adjusting the position of the specimen holder toward and away from the vertical axis of the pivot post.

6. A posing apparatus for micrographic photography, consisting of a rotary stage, a pivot post therefor, means for adjusting the position of the stage rotatively, a vertical specimen holding frame, sliding supports therefor upon said stage and adjusting devices for adjusting the position of the holder toward and away from the vertical axis of the pivot post on the stage.

7. In a photographic apparatus, a standard, a main frame supported by said standard, a camera upon said frame, a microscope and a suitable support therefor, a sliding frame upon the main frame, a post thereon and a rotary stage upon said post and a specimen holder, sliding supports for said specimen holder and devices for adjusting the position of the specimen holder upon said stage.

8. In a photographic apparatus, a camera, a supporting standard and a frame supported by said standard, a microscope and a posing apparatus for the specimens and an adjustable standard for the microscope and posing apparatus adjustable on said frame and toward and away from each other.

9. In a photographic apparatus, a camera supporting standard and a frame supported by said standard, a microscope and an upright upon the frame supporting the camera, a circular support upon said upright, a rotary wheel or stage upon said support provided with gear upon its periphery, and a worm engaging with the worm gear brackets on the said support for the stage supporting the worm, and a specimen holder upon said stage and sliding supports for said holder, movable in the direction of the camera.

FRANK N. MERWIN.

Witnesses:
 HARRY L. GREEN,
 NATHAN F. CARTER.